United States Patent
Brown et al.

(10) Patent No.: US 9,115,694 B2
(45) Date of Patent: Aug. 25, 2015

(54) WIND TURBINE PITCH CONTROL SYSTEM

(75) Inventors: Michael Gregory Brown, Simpsonville, SC (US); Jeffrey Alan Melius, Roanoke, VA (US)

(73) Assignee: General Electric Company

( * ) Notice: Subject to any disclaimer, the term of this patent is extended or adjusted under 35 U.S.C. 154(b) by 190 days.

(21) Appl. No.: 13/595,001

(22) Filed: Aug. 27, 2012

(65) Prior Publication Data

US 2014/0054892 A1 Feb. 27, 2014

(51) Int. Cl.
*F03D 9/00* (2006.01)
*F03D 7/02* (2006.01)

(52) U.S. Cl.
CPC ........... *F03D 7/0224* (2013.01); *F05B 2260/76* (2013.01); *F05B 2270/107* (2013.01); *F05B 2270/602* (2013.01); *Y02E 10/721* (2013.01); *Y02E 10/723* (2013.01)

(58) Field of Classification Search
CPC ............. F03D 7/0224; F05B 2270/107; F05B 2260/76; F05B 2270/602
USPC ........................ 290/44, 55; 700/286, 287, 290
See application file for complete search history.

(56) References Cited

U.S. PATENT DOCUMENTS

| | | | |
|---|---|---|---|
| 5,332,954 A | 7/1994 | Lankin | |
| 5,907,192 A | 5/1999 | Lyons et al. | |
| 7,042,110 B2 | 5/2006 | Mikhail et al. | |
| 7,126,236 B2 | 10/2006 | Harbourt et al. | |
| 7,245,037 B2 | 7/2007 | Angquist et al. | |
| 7,256,509 B2 | 8/2007 | Brandt et al. | |
| 7,488,155 B2 | 2/2009 | Barbu et al. | |
| 7,942,631 B2 | 5/2011 | Melius | |
| 2007/0286731 A1* | 12/2007 | Dantlgraber | 416/162 |
| 2008/0054641 A1* | 3/2008 | Voss | 290/44 |
| 2008/0150282 A1* | 6/2008 | Rebsdorf et al. | 290/44 |
| 2009/0058086 A1 | 3/2009 | Arinaga et al. | |
| 2010/0135791 A1* | 6/2010 | Melius | 416/1 |
| 2012/0043760 A1* | 2/2012 | Hagedorn | 290/44 |

FOREIGN PATENT DOCUMENTS

| | | |
|---|---|---|
| DE | 10338127 A1 | 3/2005 |
| DE | 102010016105 A1 | 9/2011 |
| DE | 202010004045 U1 | 10/2011 |

(Continued)

OTHER PUBLICATIONS

EP Third Party Observations issued in connection with corresponding CN Application No. 13180203.5 on Sep. 12, 2014.

(Continued)

*Primary Examiner* — Julio Gonzalez Ramirez
(74) *Attorney, Agent, or Firm* — Dority & Manning, P.A.

(57) ABSTRACT

A pitch control system for a wind turbine is disclosed. The pitch control system may generally include a motor having an armature and a winding and a grid power source configured to supply electrical power to the motor. The pitch control system may also include a plurality of switching components configured to control a first current through the armature independent of a second current through the winding. In addition, the pitch control system may include an auxiliary switching component electrically coupled between the grid power source and at least a portion of the switching components. The auxiliary switching component may be configured to be opened when a grid voltage of the grid power source exceeds a first voltage threshold.

14 Claims, 3 Drawing Sheets

(56) References Cited

FOREIGN PATENT DOCUMENTS

| | | | |
|---|---|---|---|
| DE | 102010060380 B3 | 2/2012 | |
| EP | 2108825 A2 | 10/2009 | |

OTHER PUBLICATIONS

European Search, Report and Opinion issued in conjunction with EP Application No. 13180203.5, on Nov. 19, 2014.

* cited by examiner

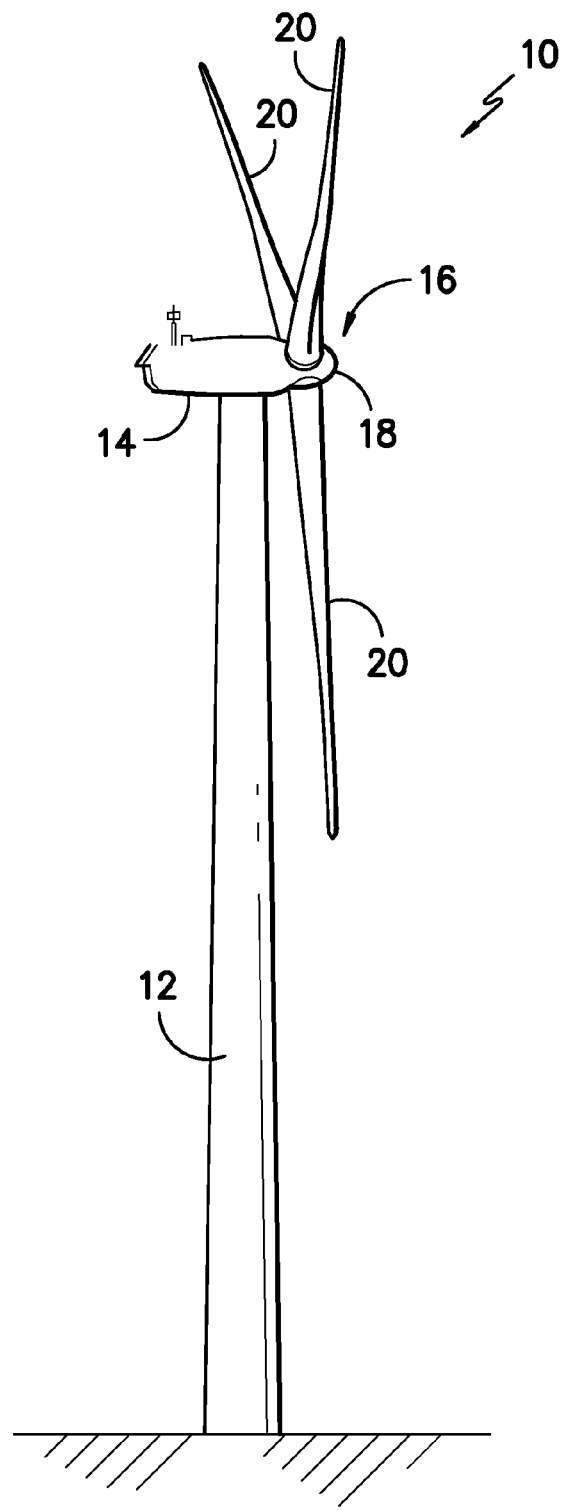
FIG. -1-

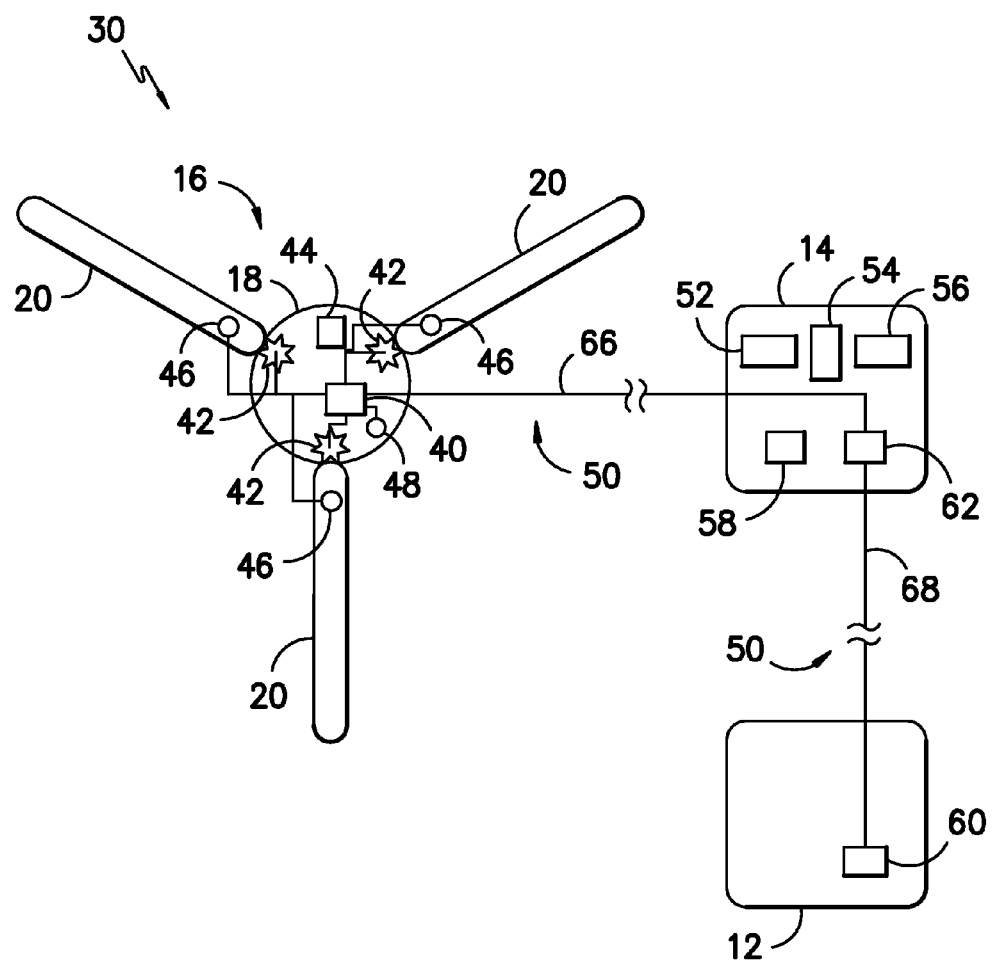
FIG. -2-

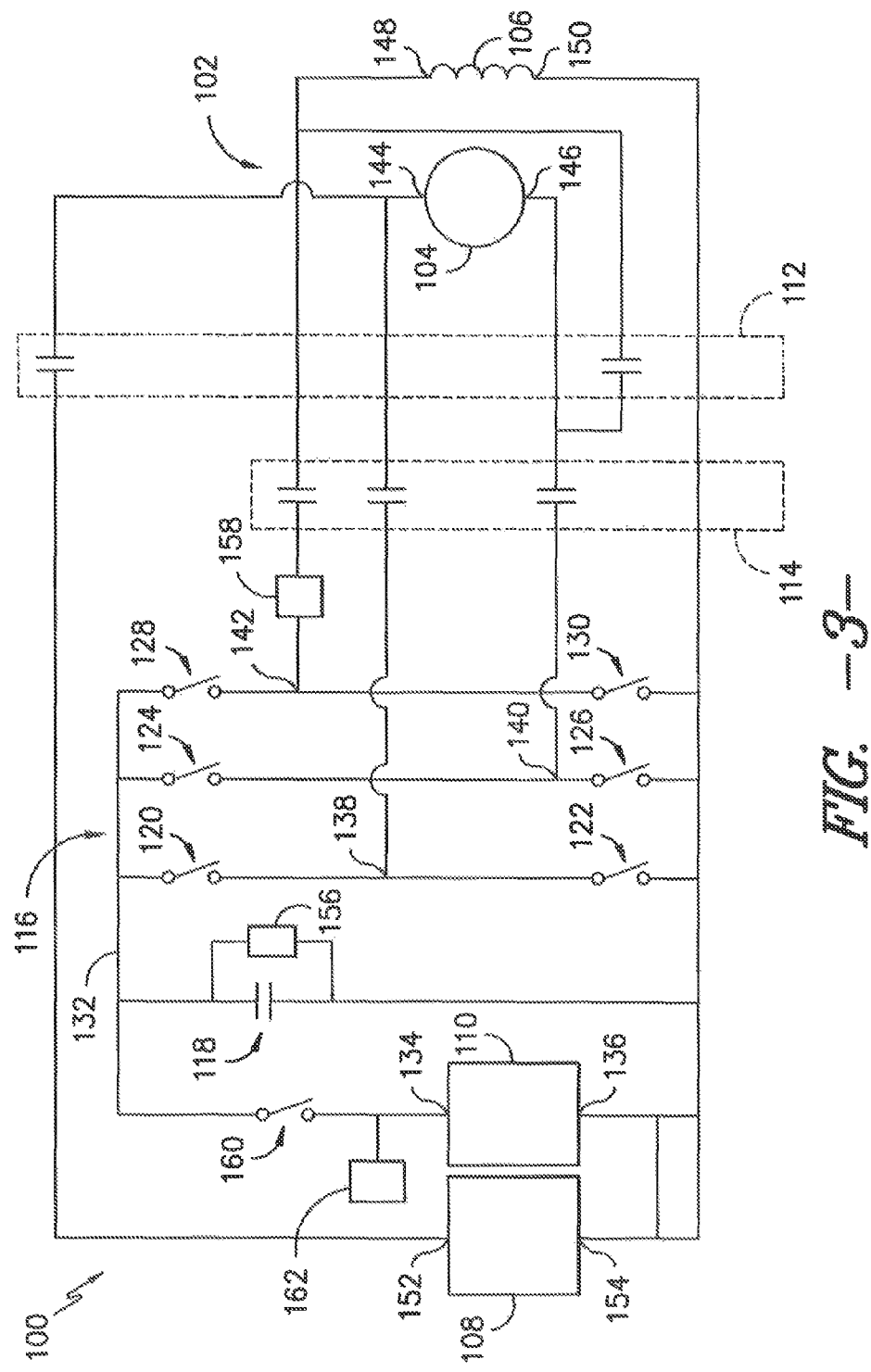
FIG. -3-

WIND TURBINE PITCH CONTROL SYSTEM

FIELD OF THE INVENTION

The present subject matter relates generally to wind turbines and, more particularly, to a wind turbine pitch control system that is configured to protect the various components of the system from high voltage transients.

BACKGROUND OF THE INVENTION

A pitch control system is typically used to adjust the pitch of one or more rotor blades of a wind turbine. As is generally understood, the pitch control system may include a motor that is configured to rotate a rotor blade to a desired pitch angle to adjust an amount of wind energy captured by the blade.

Known pitch control systems typically use a direct current (DC) motor that has a series field winding to pitch the blades. Such DC motors may include a dynamic braking resistor to facilitate absorbing excess energy generated by the DC motor during motor braking conditions. Moreover, to reverse a rotational direction of the DC motor, rectification diodes are included in the pitch control system. Such dynamic braking resistors and rectification diodes may add cost and complexity to known pitch control systems and may produce energy losses within the pitch control system. Further, the series field winding of the DC motor typically shares a current with an armature of the DC motor, which can be increased or decreased to adjust the operation of the DC motor. However, due to the common current between the armature and the winding, an adjustment of the armature current will also affect the winding current. As such, independent control of the armature and the winding of the DC motor may not be possible.

Typically, electrical power is supplied to the DC motor and the various other electrical components of the pitch control system via an electric utility grid. As a result, when the electric utility grid experiences a high voltage event or transient, the pitch control system may be subject to voltages that exceed the grid's nominal grid voltage. Such high voltage transients may lead to damage to the DC motor and/or other electrical components of the pitch control system, particularly when the voltage transient lasts for extended period of time and/or when the grid voltage greatly exceeds the nominal grid voltage.

Accordingly, an improved pitch control system that is capable of accommodating high voltage transients would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a pitch control system for a wind turbine. The pitch control system may generally include a motor. A grid power source may be configured to supply electrical power to the motor. The pitch control system may also include a plurality of switching components configured to control the current supplied to the motor. In addition, the pitch control system may include an auxiliary switching component electrically coupled between the grid power source and at least a portion of the switching components. The auxiliary switching component may be configured to be opened when a grid voltage of the grid power source exceeds a first voltage threshold.

In another aspect, the present subject matter is directed to a wind turbine including at least one rotor blade and a pitch control system configured to control a pitch of the rotor blade. The pitch control system may generally include a motor having an armature and a winding. A grid power source may be configured to supply electrical power to the motor. The pitch control system may also include a plurality of switching components configured to control a first current through the armature independent of a second current through the winding. In addition, the pitch control system may include an auxiliary switching component electrically coupled between the grid power source and at least a portion of the switching components. The auxiliary switching component may be configured to be opened when a grid voltage of the grid power source exceeds a first voltage threshold.

In a further aspect, the present subject matter is directed to a method for controlling power supplied to a pitch control system of a wind turbine. The method may generally include supplying electrical power to the pitch control system from a grid power source, monitoring a grid voltage of the grid power source and switching the supply of electrical power from the grid power source to a battery power source when the grid voltage exceeds a first voltage threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective, side view of one embodiment of a wind turbine;

FIG. 2 illustrates a block diagram of one embodiment of a wind turbine control system that may be used with the wind turbine shown in FIG. 1; and, FIG. 3 illustrates a schematic diagram of one embodiment of a pitch control system that may be used with the wind turbine shown in FIG. 1.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a pitch control system for a wind turbine. The pitch control system may include a motor that has an armature and a winding. The motor may be configured to receive a first current through the armature and a second current through the winding. In addition, the pitch control system may include a plurality of switching components configured to control the first current independent of the second current while the pitch control system receives power from an electric utility grid. The pitch control system may also include an auxiliary switching component configured to connect/disconnect the system from the electric utility grid in order to prevent component damage due to excessive grid voltages occurring during high voltage transients. For instance, the auxiliary switching component may be configured to be opened (thereby disconnecting the pitch control system from the electric utility grid) when the grid voltage exceeds a predetermined voltage threshold. However, once the grid voltage falls below this voltage threshold (or a different voltage threshold), the auxiliary switching component may be closed to reconnect the pitch control system to the electric utility grid.

Referring now to the drawings, FIG. 1 illustrates a perspective, side view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced.

Referring now to FIG. 2, a schematic diagram of one embodiment of a wind turbine control system 30 that may be used to control the operation of a wind turbine 10 (FIG. 1) is illustrated in accordance with aspects of the present subject matter. In general, the control system 30 may be communicatively coupled to various components located within the hub 18, the rotor blades 20, the nacelle 14, and/or the tower 12. As shown in FIG. 2, in several embodiments, the control system 30 may include a pitch controller 40 and at least one pitch drive 42 positioned on or within the hub 16. As is generally understood, the pitch controller 40 may be configured to control the pitch angle of the rotor blades 20 (i.e., an angle that determines a perspective of each blade 22 with respect to the direction of the wind) by controlling the operation of the pitch drives 42. Specifically, in one embodiment, the pitch controller 40 may be configured to rotate each blade 20 about its longitudinal axis by transmitting suitable pitch commands to the blade's respective pitch drive 42. Additionally, as will be described below, the pitch controller 40 may be communicatively coupled to a wind turbine controller 60 of the control system 30 via a suitable communication network 50.

In one embodiment, the pitch controller 40 may comprise a programmable logic controller (PLC). In an alternative embodiment, the pitch controller 40 may comprise a microprocessor, a microcontroller, a field programmable gate array (FPGA) or any other programmable circuit that enables the pitch controller 40 to operate as described herein. As used herein, the term "control" includes, but is not limited to, issuing commands to be implemented by exercising oversight and supervision of, and/or directing operation of, one or more subject components. The term "control" may also include a regulation-type of control (e.g., a feedback-loop regulation).

As indicated above, the pitch drives 42 may be configured to receive one or more pitch commands from the pitch controller 40 and, in response to such commands, rotate the rotor blades 18 to a desired position and/or pitch angle. In several embodiments, the pitch drives 42 may be configured to rotate the rotor blades 18 using any suitable means, such as a hydraulic, electric, and/or gear-driven means. For instance, in a particular embodiment, each pitch drive 42 may include a pitch motor configured to rotate a drive pinion rotatably engaged with a pitch bearing (not shown) of the rotor blades 20.

Various other components may also be positioned on or within the hub 18. For instance, a hub backup power supply 44 may be positioned within the hub 16 so as to provide backup power to the pitch controller 40 and the pitch drives 42. The hub backup power supply 44 may comprise, for example, a battery, a magnetic energy storage device, one or more capacitors and/or any other suitable energy source. In addition, the hub 18 may include one or more hub sensors 48 configured to monitor one or more operating parameters of the hub 18, such as a rotational speed of and/or loads induced to the hub 18.

Additionally, as shown in FIG. 2, the control system 30 may also include a plurality of blade sensors 46, with at least one blade sensor 46 being operably positioned on or within each rotor blade 20. In several embodiments, the blade sensors 46 may be configured to monitor one or more operating parameters of the rotor blades 20, such as the rotational speed of and/or loads induced to each blade 20. Moreover, in one embodiment, the blade sensors 46 may be communicatively coupled to the pitch controller 40 to allow measurements provided by the sensors 46 to be transmitted to the controller 40.

Referring still to FIG. 2, in several embodiments, the nacelle 14 may include a gearbox 52, a brake 54, a generator 56, a battery 58, and a nacelle controller 62. However, in an alternative embodiment, the nacelle 14 may not include a gearbox 52. As is generally understood, the gearbox 52 may be configured to augment the rotation of a main rotor shaft (not shown) driven by the rotor 16, thereby inducing a higher amount of rotational energy to the generator 56. The brake 54 may be configured to provide emergency stopping power to the generator 56 and/or to the wind turbine 10 in an event of a fault or any other error condition. In addition, the generator 56 may be configured to transform the rotational energy of the main rotor shaft into electrical energy. Thus, it should be appreciated that the generator 56 may generally comprise any suitable generator know in the art that enables the wind turbine 10 to function as described herein. For example, in one embodiment, the generator 56 may comprise a wound rotor induction generator, such as a doubly fed induction generator. Moreover, similar to the hub backup power supply 44 described above, the battery 58 may generally be configured to provide backup electrical power to the various components housed within the nacelle 14 and/or the tower 12.

The nacelle controller 62 may generally be configured to control the operation of the various components housed within the nacelle 14, such as the gearbox 52, the brake 54, the generator 56, and/or the battery 58. Additionally, in several embodiments, the nacelle controller 62 may be communicatively coupled to the pitch controller 40 and to the wind turbine controller 60 via the communication network 50. Specifically, as shown in FIG. 2, the nacelle controller 62 may be coupled to the pitch controller 40 via a nacelle-hub network 66 and to the wind turbine controller 60 via a nacelle-tower network 68.

As indicated above, the control system 30 may also include a wind turbine controller 60. As shown in FIG. 2, the wind turbine controller 60 may be disposed within the tower 12. However, in other embodiments, the wind turbine controller

60 may be disposed at any other suitable location, such as within the nacelle 14 or at a location separate from the wind turbine 10. In general, the wind turbine controller 60 may operate as the master controller for the wind turbine 10 and, thus, may be configured to control the various other controllers of the wind turbine 10, such as the pitch controller 40 and the nacelle controller 62. In addition, the wind turbine controller 60 may be configured to communicate with other wind turbines (not shown) and/or a wind farm management system (not shown) and/or perform error handling and operational optimization. Moreover, the wind turbine controller 60 may also be configured to execute a SCADA (Supervisory, Control and Data Acquisition) program.

It should be appreciated that the wind turbine controller 60 may generally comprise a computer or any other suitable processor that may be programmed to execute control algorithms. As used herein, the term "processor" includes, without limitation, any programmable system including systems and microcontrollers, reduced instruction set circuits (RISC), application specific integrated circuits (ASIC), programmable logic circuits (PLC), and any other circuit capable of executing the functions described herein.

As indicated above, the various controllers of the control system 30 may be communicatively coupled via a communication network 50. As shown in FIG. 2, the communication network 50 may generally include a nacelle-hub network 66 and nacelle-tower network 68. Thus, the pitch controller 40 may be coupled to the wind turbine controller 60 via both the nacelle-hub network 66 and the nacelle-tower network 68 while the nacelle controller 62 may be coupled to the wind turbine controller 60 via the nacelle-tower network 68.

In one embodiment, the nacelle-hub network 66 may use a slip ring connection to transmit signals via a serial communication protocol or another suitable communication protocol, such as broadband over power line (BPL) protocol. In an alternative embodiment, the nacelle-hub network 66 may include any other connection that enables the network 66 to operate as described herein. Similarly, in one embodiment, the nacelle-tower network 68 may include one or more of such connections as Ethernet Local Area Network (LAN), wireless LAN, a Controller Area Network (CAN) bus, fiber optic connection, or any other communication connection (all not shown) that enables the nacelle-tower network 68 to operate as described herein.

Referring now to FIG. 3, a schematic diagram of one embodiment of a pitch control system 100 that may be used with, or in place of, the pitch drives 42 (FIG. 2) to pitch the rotor blade blades 18 of the wind turbine 10 (FIG. 1) is illustrated in accordance with aspects of the present subject matter. As shown in FIG. 3, the pitch control system 100 may include a motor 102 having an armature 104 and a winding 106. As described herein, the motor 102 may generally comprise a DC motor. However, it should be appreciated that the motor 102 may, alternatively, comprise an AC motor.

In the illustrated embodiment, the pitch control system 100 may be configured to receive electrical power from a battery power source 108 and a grid power source 110 (e.g., an electric utility grid). The battery power source 108 may generally comprise one or more batteries, capacitors, and/or any suitable energy storage device that enables the pitch control system 100 to operate as described herein. The grid power source 110 may, in one embodiment, be coupled to a rectified output of an alternating current (AC) power grid. Alternatively, the grid power source 110 may be coupled to any suitable direct current (DC) or rectified AC power source that enables the pitch control system 100 to operate as described herein.

In several embodiments, the battery power source 108 and the grid power source 110 may be configured to provide substantially DC power to the pitch control system 100 and, specifically, to the motor 102. As shown in FIG. 3, the battery power source 108 may be switchably coupled to the motor 102 via one or more battery contactors 112 and the grid power source 110 may be switchably coupled to motor 102 via one or more grid contactors 114. The battery contactors 112 may be opened or closed to electrically decouple or couple, respectively, the battery power source 108 and the motor 102. Similarly, the grid contactors 114 may be opened or closed to electrically decouple or couple, respectively, the grid power source 110 and the motor 102. Thus, in several embodiments, the battery contactors 112 and the grid contactors 114 may be controlled such that only one of the battery power source 108 and the grid power source 110 is connected to, and powers, the motor 102 at any given time. It should be appreciated that the battery contactors 112 and/or the grid contactors 114 may include one or more contactors, relays, or other suitable components that enable the pitch control system 100 to operate as described herein.

Additionally, as shown in FIG. 3, the pitch control system 100 may also include a plurality of switching components 116 and at least one capacitor 118. The capacitor 118 may be configured to facilitate smoothing of the voltage from the grid power source 110, and may also facilitate providing a high frequency current to the switching components 116. The switching components 116 may generally be configured to facilitate controlling the operation of the motor 102, such as by controlling the current to the armature 104 and/or the winding 106. In several embodiments, the switching components 116 may be coupled to the motor 102 when the grid power source 110 powers the pitch control system 100 (i.e., when the grid contactors 114 are closed and battery contactors 112 are open). Alternatively, when the grid contactors 114 are open and the battery contactors 112 are closed, the switching components 116 may be substantially electrically isolated from the motor 102 and the motor 102 may be substantially controlled and powered by the battery source 108.

As shown in FIG. 3, in several embodiments, the switching components 116 may include a first switch 120, a second switch 122, a third switch 124, a fourth switch 126, a fifth switch 128, and a sixth switch 130. The first switch 120, the third switch 124, and the fifth switch 128 may be coupled to a first terminal 134 of the grid source 110 via a DC link 132. The second switch 122, the fourth switch 126, and the sixth switch 130 may be coupled to a second terminal 136 of the grid source 110. In one embodiment, the switching components 116 may comprise metal-oxide semiconductor field-effect transistors (MOSFETs). In an alternative embodiment, the switching components 116 may comprise insulated gate bipolar transistors (IGBTs), bipolar junction transistors (BJTs), or any suitable switching device that enables the pitch control system 100 to operate as described herein.

In several embodiments, the first switch 120 and the second switch 122 may be coupled to each other at a common node 138 and may be coupled in parallel with the grid power source 110. In addition, the common node 138 of the first and second switches 120, 122 may be coupled to a first terminal 144 of the armature 104. Similarly, the third switch 124 and the fourth switch 126 may be coupled to each other at a common node 140 and may be coupled in parallel with the grid power source 110. The common node 140 of the third and fourth switches 124, 126 may be coupled to a second terminal 146 of the armature 104. Moreover, the fifth switch 128 and the sixth switch 130 may be coupled to each other at a common node 142 and may be coupled in parallel with the grid power source 110. The common node 142 of the fifth and sixth switches 128, 130 may be coupled to a first terminal 148 of the winding 106.

Further, a first terminal 152 of the battery source 108 may be coupled to the first terminal 144 of the armature 104. A second terminal 150 of the winding 106 may be coupled to the second, fourth, and sixth switches 122, 126 130, to the second terminal 136 of the grid power source 110, and to a second terminal 154 of the battery power source 108.

The capacitor 118 may be coupled in parallel with the grid power source 110 and more specifically, coupled to the first terminal 134 of the grid power source 110 via the DC link 132 and to the second terminal 136 of the grid power source 110. In several embodiments, a voltage sensor 156 may be configured to measure the voltage across the capacitor 118 and a current sensor 158 may be configured to measure the current transmitted between the first terminal 148 of the winding 106 and the common node 142 of the fifth and sixth switches 128, 130.

Additionally, in several embodiments, the pitch controller 40 (FIG. 2) may be operatively coupled to the pitch control system 100. Thus, when the pitch control system 100 is powered by the grid power source 110, the pitch controller 40 may facilitate controlling the operation of the pitch control system 100, and, more specifically, the operation of the motor 102, as described in more detail below. In one embodiment, the pitch controller 40 may be configured to receive voltage measurements from the voltage sensor 156 and current measurements from the current sensor 158. The pitch controller 40 may then adjust one or more switching characteristics (e.g., a duty cycle) of the switching components 116 based on the received voltage and/or current measurements.

During operation, the grid contactors 114 may be closed and the battery contactors 112 may be open such that the grid power source 110 provides power to the pitch control system 100. More specifically, in one embodiment, the first switch 120, the second switch 122, the third switch 124, and the fourth switch 126 may transmit DC current from the grid power source 110 to the armature 104 while the fifth and sixth switches 128, 130 may transmit DC current from the grid power source 110 to the winding 106. As such, the armature 104 and the winding 106 may be separately controlled and powered while the grid power source 110 powers the pitch control system 100.

As indicated above, the pitch controller 40 may be configured to control a duty cycle of each switching component 116. More specifically, the pitch controller 40 may adjust the duty cycle of each switching component 116 to control an amount of current carried through each switching component 116 to the motor 102. To provide more current to the armature 104, the pitch controller 40 may increase the duty cycle of the first switch 120 or the third switch 124. Moreover, the pitch controller 40 may operate the first switch 120 and the second switch 122 at alternating duty cycles, the third switch 124 and the fourth switch 126 at alternating duty cycles, and the fifth switch 128 and the sixth switch 130 at alternating duty cycles. As used herein, "alternating" or "alternates" refers to opening and closing a switch at an opposite time as another switch, such that when one switch is open, the other switch is closed, and vice versa. As such, alternating switches have duty cycles that are substantially inverses of each other.

When the motor 102 is to be driven in a clockwise direction, the pitch controller 40 may be configured to open the third switch 124, close the fourth switch 126 and operate the first and second switches 120, 122 at alternating duty cycles. In addition, the pitch controller 40 may increase the duty cycle of the first switch 120 to increase a rotational speed of the motor 102, and decrease the duty cycle of the first switch 120 to decrease the rotational speed of the motor 102. As such, to achieve a maximum rotational speed of the motor 102 in the clockwise direction, the pitch controller 40 may operate the first switch 120 at approximately a 100% duty cycle, and to achieve a substantially stationary state of the motor 102, the pitch controller 40 may operate the first switch 120 at approximately a 0% duty cycle.

When the motor 102 is to be reversed (i.e., driven in a counterclockwise direction), the pitch controller 40 may be configured to open the first switch 120, close the second switch 122 and operate the third fourth switches 124, 126 at alternating duty cycles. In addition, the pitch controller 40 may increase the duty cycle of the third switch 124 to increase a rotational speed of the motor 102 and may decrease the duty cycle of the third switch 124 to decrease the rotational speed of the motor 102. As such, to achieve a maximum rotational speed of the motor 102 in the counterclockwise direction, the pitch controller 40 may operate the third switch 124 at approximately a 100% duty cycle, and to achieve a substantially stationary state of the motor 102, the pitch controller 40 may operate the third switch 124 at approximately a 0% duty cycle.

The pitch controller 40 may also operate the fifth switch 128 and the sixth switch 130 to control a current through the winding 106. As such, the grid power source 110 and the switching components 116 may facilitate providing separately controlled currents to the armature 104 and the winding 106 such that the motor 102 operates as a separately excited DC motor. The motor 102 may generate excess, or regenerative, energy within the pitch control system 100, such as during a motor braking operation. If excess energy is present in the pitch control system 100, the pitch controller 40 may direct the excess energy to the winding 106 such that the winding 106 absorbs at least a portion of the excess energy. More specifically, if the voltage measured by voltage sensor 156 rises above a threshold determined by the pitch controller 40, the pitch controller 40 may close the fifth switch 128 to direct the energy to the winding 106. The pitch controller 40 may also operate the fifth switch 128 at a duty cycle between approximately 0% and 100% to direct a portion of the excess energy to the winding 106. Alternatively, the pitch controller 40 may operate the fifth switch 128 at approximately a 100% duty cycle to direct a maximum amount of excess energy to the winding 106, or the pitch controller 40 may operate the fifth switch 128 at approximately a 0% duty cycle to substantially prevent excess energy from being directed to the winding 106.

If a loss of power from the grid power source 110 or a failure within the pitch control system 100 occurs, the pitch control system 100 may switch to the backup power provided by the battery power source 108 by opening the grid contactors 114 and closing the battery contactors 112. While pitch control system 100 is powered by the battery power source 108, the pitch controller 40 may not control the motor 102 via the switching components 116. Rather, the battery power source 108 may provide a substantially constant current to the motor 102 and facilitate pitching the blades 20 to a feathered position. In such operation, the armature 104 and the winding 106 may be coupled in series with each other such that the battery power source 108 provides an equal and commonly controlled current to the armature 104 and the winding 106 and such that the motor 102 operates substantially as a series DC motor. If power is restored from the grid power source 110 or the failure within the pitch control system 100 is corrected, the pitch control system 100 may resume operation via the grid power source 110 by opening the battery contactors 112 and the closing grid contactors 114.

In addition, to prevent excessive grid voltages from being supplied to the motor 102 and other components located downstream of the grid power source 110, the pitch control system 100 may also include an auxiliary switching component 160 electrically coupled between the grid power source 110 and at least a portion of the switching components 120, 122, 124, 126, 128, 130. For instance, as shown in FIG. 3, the auxiliary switching component 160 may be coupled between grid power source 110 and the first, third, and/or fifth switches 120, 124, 128, such as by being coupled between the first terminal 134 of the grid power source 110 and the DC link 132. Alternatively, the auxiliary switching component 160 may be coupled between the grid power source 110 and the second, fourth and/or sixth switches 122, 126, 130.

It should be appreciated that the auxiliary switching component 160 may generally comprise any suitable switching device that allows the pitch control system 100 to function as described herein. For instance, the auxiliary switching component 160 may be a relay, an insulated gate bipolar transistor (IGBT), a bipolar junction transistor (BJT), a silicon-controlled rectifier (SCR), a metal-oxide-semiconductor field-effect transistor (MOFSET), other semiconductor and/or electromagnetic switching devices and/or any other suitable switching devices known in the art (e.g., diodes).

In general, the auxiliary switching component 160 may be configured to be opened when a grid voltage of the grid power source 110 exceeds a first voltage threshold. For example, as shown in FIG. 2, a voltage sensor 162 may be configured to measure the grid voltage supplied to the auxiliary switching component 160 and subsequently transmit such voltage measurements to the pitch controller 40 (FIG. 2). The pitch controller 40 may then be configured to open the auxiliary switching component 160 when the grid voltage exceeds the first voltage threshold. By opening the auxiliary switching component 160, the pitch control system 100 may be placed into a low-voltage ride through (LVRT) condition, whereby the system 100 is electrically isolated from the grid power source 110 and electrical power is supplied to the motor 102 via the battery power source 108. Additionally, once the grid voltage falls below a second voltage threshold, the pitch controller 40 may be configured to close the auxiliary switching component 160 to reconnect the grid power source 110 to the pitch control system 100.

It should be appreciated that, in several embodiments, the first voltage threshold may generally correspond to a predetermined voltage threshold above which it is believed that the components of the pitch control system 100 may be subject to damage due to excessive grid voltages. For instance, in one embodiment, the first voltage threshold may correspond to a voltage equal to greater than about 110% of the nominal grid voltage of the grid power source 110, such as a voltage greater than about 120% of the nominal grid voltage or greater than about 130% of the nominal grid voltage or greater than about 140% of the nominal grid voltage.

Similarly, the second voltage threshold may generally correspond to a predetermined voltage threshold below which it is believed that the components of the pitch control system 100 may operate without being subject to damage due to excessive grid voltages. In several embodiments, the second voltage threshold may be the same as the first voltage threshold. Thus, when the grid voltage exceeds the voltage threshold, the auxiliary switching component 160 may be opened and, when the grid voltage falls below that same threshold, the auxiliary switching component 160 may be closed. Alternatively, the second voltage threshold may differ from the first voltage threshold. For instance, in one embodiment, the second voltage threshold may correspond to a predetermined voltage threshold equal to less than about 120% of the nominal grid voltage of the grid power source 110, such as a voltage less than about 115% of the nominal grid voltage or less than about 110% of the nominal grid voltage.

It should be appreciated that setting the second voltage threshold at a different voltage than the first voltage threshold may be desirable when the first voltage threshold is set relatively high. For example, if the first voltage threshold is set at a voltage greater than about 130% or 140% of the nominal grid voltage, it may be desirable to set the second voltage threshold at a lower voltage (e.g., less than about 120% of the nominal voltage) to ensure that the grid voltage has sufficiently decreased prior to reconnecting the pitch control system 100 to the grid power source 110.

It should also be appreciated that, in several embodiments, the auxiliary switching component 160 may be closed immediately after the grid voltage falls below the second voltage threshold or the auxiliary switching component 160 may be closed after the grid voltage has been below the second voltage threshold for a predetermined time period. For instance, in embodiments in which the second voltage threshold is set at less than about 120% of the nominal grid voltage, the pitch controller 40 may be configured to close the auxiliary switching component 160 after the grid voltage has been below 120% of the nominal grid voltage for suitable delay period (e.g., two seconds). Such a delay period may be implemented to ensure that the high voltage transient is over prior to reconnecting the pitch control system 100 to the grid power source 110.

It should also be appreciated that the present subject matter is directed to a method for controlling the electrical power supplied to a pitch control system 100 of a wind turbine 10. In several embodiments, the method may include supplying electrical power to the pitch control system 100 from a grid power source 110, monitoring a grid voltage of the grid power source 110 and switching the supply of electrical power from the grid power source 110 to a battery power source 108 when the grid voltage exceeds a first voltage threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch control system for a wind turbine, the pitch control system comprising:
   a motor;
   a grid power source configured to supply electrical power to the motor, the grid source including a first terminal and a second terminal;
   a plurality of switching components configured to control current supplied to the motor, the plurality of switching components including a first set of switching components electrically coupled to the first terminal and a second set of switching components electrically coupled to the second terminal, the first set of switching components being electrically coupled to the first terminal through a DC link; and, an auxiliary switching component electrically coupled between the grid power source and the DC link, the auxiliary switching component configured to be opened when a grid voltage of the grid power source exceeds a first voltage threshold.

2. The pitch control system of claim 1, wherein the motor includes an armature and a winding, the plurality of switching components configured to control a first current through the armature independent of a second current through the winding.

3. The pitch control system of claim 1, further comprising a battery power source configured to supply electrical power to the motor when the auxiliary switching component is opened.

4. The pitch control system of claim 1, wherein the first voltage threshold is equal to greater than about 110% of a nominal grid voltage of the grid power source.

5. The pitch control system of claim 1, wherein the first voltage threshold is equal to greater than about 140% of a nominal grid voltage of the grid power source.

6. The pitch control system of claim 1, wherein the auxiliary switching component is configured to be closed when the grid voltage falls below a second voltage threshold.

7. The pitch control system of claim 6, wherein the second voltage threshold is equal to less than about 120% of a nominal grid voltage of the power grid source.

8. The pitch control system of claim 6, wherein the second voltage threshold is equal to less than about 110% of a nominal grid voltage of the grid power source.

9. The pitch control system of claim 1, further comprising a voltage sensor configured to measure the grid voltage of the grid power source and a pitch controller communicatively coupled to the voltage sensor, the pitch controller being configured to open and close the auxiliary switching component based on the grid voltage measurements provided by the voltage sensor.

10. A wind turbine, comprising:
at least one rotor blade; and
a pitch control system configured to control a pitch of the at least one rotor blade, the pitch control system comprising:
   a motor including an armature and a winding;
   a grid power source configured to supply electrical power to the motor, the grid source including a first terminal and a second terminal;
   a plurality of switching components configured to control a first current through the armature independent of a second current through the winding, the plurality of switching components including a first set of switching components electrically coupled to the first terminal and a second set of switching components electrically coupled to the second terminal, the first set of switching components being electrically coupled to the first terminal through a DC link; and,
   an auxiliary switching component electrically coupled between the grid power source and the DC link, the auxiliary switching component configured to be opened when a grid voltage of the grid power source exceeds a first voltage threshold.

11. The wind turbine of claim 10, further comprising a battery power source configured to supply electrical power to the motor when the auxiliary switching component is opened.

12. The wind turbine of claim 10, wherein the first voltage threshold is equal to greater than about 110% of a nominal grid voltage of the grid power source.

13. The wind turbine of claim 10, wherein the auxiliary switching component is configured to be closed when the grid voltage falls below a second voltage threshold.

14. The wind turbine of claim 13, wherein the second voltage threshold is equal to less than about 120% of a nominal grid voltage of the grid power source.

* * * * *